United States Patent
Tsubouchi

[15] 3,680,044
[45] July 25, 1972

[54] LIQUID LEVEL INDICATING ARRANGEMENT FOR VEHICLES

[72] Inventor: Kadru Tsubouchi, Toyota, Japan

[73] Assignee: Aisin Seiki Kabushiki Kaisha, Kariya, Japan

[22] Filed: Feb. 5, 1971

[21] Appl. No.: 112,914

[30] Foreign Application Priority Data

Feb. 10, 1970 Japan..................45/13154

[52] U.S. Cl..................340/59, 200/84, 340/244
[51] Int. Cl..................G08b 21/00
[58] Field of Search..................340/59, 244; 200/84

[56] References Cited

UNITED STATES PATENTS

| | | | |
|---|---|---|---|
| 3,204,230 | 8/1965 | Hosford, Jr. | 340/59 X |
| 3,246,517 | 4/1966 | Malkiewicz | 340/244 X |
| 3,258,968 | 7/1966 | Woodcock | 340/244 X |

*Primary Examiner*—Alvin H. Waring
*Attorney*—Pierce, Scheffler & Parker

[57] ABSTRACT

A liquid level indicating arrangement for an oil reservoir of a brake master cylinder, comprising a magnetically actuated lead switch to operate a warning lamp for indicating the need of supplying the oil, said lead switch being housed within a coaxially extending tubular housing formed vertically to and integrally with a bottom wall of a reservoir shell whereby it may be easy to supply the oil.

6 Claims, 1 Drawing Figure

PATENTED JUL 25 1972　　3,680,044
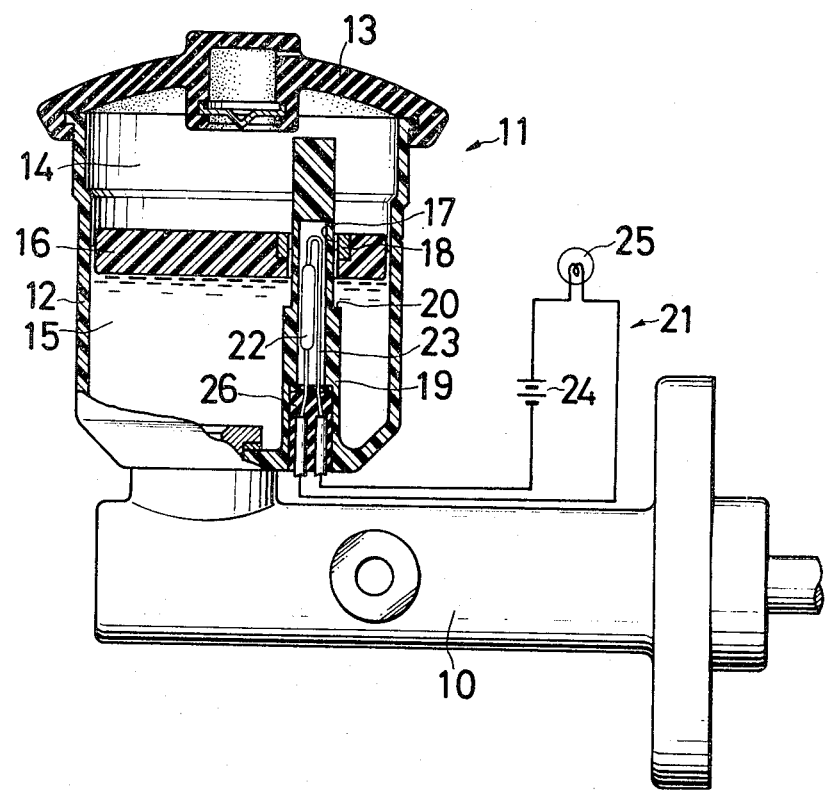

LIQUID LEVEL INDICATING ARRANGEMENT FOR VEHICLES

This invention relates to liquid level indicating arrangements including an electric switch responsive to liquid level, and more particularly to liquid level warning arrangements for detecting decrease in quantity of liquid within a liquid reservoir below a predetermined value.

In a brake master cylinder of the automotive vehicle, for instance, there is provided with a brake oil tank or reservoir for storing the brake oil therein. When the quantity of oil decreases below a predetermined value due to leakage and the like, it is impossible to perform a sufficient braking operation. In order to prevent this difficulty, there has been presented a liquid level warning system which includes a permanent magnet provided on an annular float and a switch means to cooperate therewith. When the quantity of oil decreases below a predetermined value, the float on the oil will be moved downward together with the permanent magnet to actuate the switch means whereby a warning signal is generated for indicating the need of supplying the oil.

In the conventional warning arrangement of the kind, however, the switch means is mounted within a tubular housing formed on a tank cap through which lead wires connected to the switch means, an electric power source, and a warning lamp are passed. This is undesirable because it is necessary to disconnect the lead wires from the electric circuit before removing the tank cap when the oil be supplied. In addition, the tubular switch housing of the cap is in danger of being damaged during oil supplying operation.

Therefore, the main object of the present invention is to provide a liquid level indicating arrangement in which the tank cap may be detached independently of the electric circuit, and so it is easy to supply the liquid.

The subordinate object of the invention is to provide a liquid level indicating arrangement in which the switch housing may not be damaged during the liquid supplying operation.

The liquid level indicating arrangement according to this invention comprises a liquid reservoir or tank including an upright cylindrical shell, a circular float carrying a permanent magnet and floated on the liquid, a tubular housing vertically extending from a bottom wall of the shell, and an electric circuit including a switch means housed within the tubular housing to cooperate with the magnet when the liquid level drops below a predetermined point.

Other objects, features and advantages of the invention will be apparent from the following detailed description when read with the accompanying drawing whose sole FIGURE shows a vertical sectional view of a liquid level indicating arrangement in accordance with the invention.

Referring to the sole FIGURE, the numeral 10 designates a brake master cylinder associated with an oil tank or reservoir 11. The tank 11 comprises an upright cylindrical shell 12 made of a plastics material and a closing cap 13 made of rubber and detachably mounted on an opened head of the shell 12. There is constituted an oil chamber 14 by the cylindrical shell 12 within which a brake oil 15 is admitted. A circular float 16 made of suitable material, such as foamed polystyrene is deposited on the oil 15 and is provided with a stepped aperture 17, an axis of the aperture being eccentric to the center of float 16. A tubular permanent magnet 18 which is suitably polarized is carried by the float 16 at the stepped aperture 17. The magnet-carrying float 16 is movable downwardly in response to the decrease in quantity of the oil 15.

The cylindrical shell 12 comprises a vertical and tubular projection 19 which extends from a bottom wall of the shell 12 and passes through the aperture 17 for guiding the downward displacement of the float 16, said projection comprising an enlarged annular shoulder 20 to limit the downward travel of the float 16.

There is provided an electric circuit 21 comprising a normally opened lead switch 22, a lead wire 23, an electric power source 24, and a warning lamp 25. The lead wire 23 is connected to a positive pole of the source 24 at its one end and to a negative pole thereof at its other end. The lead switch 22 is coaxially housed within the tubular projection 19 and positioned near the shoulder 20, said switch being closed when the magnetic force is applied thereto thus completing the electric circuit 21 to light the warning lamp 25. A resilient plug 26 is inserted in the tubular projection 19 at its opening to protect the lead switch 22 from the foreign materials such as dirt, water and dust.

When the level of brake oil 15 remains within a permissible point, the magnet-carrying float 16 is positioned above the lead switch 22 enough not to close the lead switch 22. Thus no electric current will flow in the electric circuit 21 thereby not to light the warning lamp 25.

When the oil level subsequently drops below a predetermined point, for instance, due to leakage, the float 16 moves downwardly. The downward displacement of the magnet-carrying float 16 will bring the permanent magnet 18 into attracting relation to the switch 22, thus permitting the closing of the previously open lead switch 22 to establish the circuit 21. It is to be noted that the further downward displacement of the float 16 is limited by the enlarged annular shoulder 20 even if the oil level drops still lower, whereby the lead switch 22 remains operable to produce the warning signal until the brake oil is supplied. In addition, the rotation of the circular float 16 will be prevented because the center and the rotational axis of the float 16 are not co-axial.

What is claimed is:

1. A liquid level indicating system comprising a tank having an upright cylindrical shell and including a bottom for housing a liquid, a float disposed on the upper surface of the liquid and provided with a vertical aperture therethrough and freely movable in a vertical direction according to the level of the liquid, a permanent magnet carried by said float and disposed adjacent the aperture, a tubular projection extending vertically upward from the bottom of said shell, fixed thereto and closed at its upper end, said tubular projection passing through the aperture in said float for guiding the movement thereof, electrical circuit means including a source of electric power, magnetically responsive switch means housed within said tubular projection, means for providing a signal and connecting means for connecting said source, said switch means and said signal means together, said connecting means passing into said tubular projection through the bottom thereof for connection to said switch means, said switch means being operable by said permanent magnet when adjacent said switch means to operate said signal means when the liquid level drops below a predetermined point, said tank also having a top provided with an opening therein and a removable cap for closing said opening, whereby make-up liquid may be added to said tank through said opening after removal of said cap without displacing said connecting means and said switch means.

2. A system as claimed in claim 1 wherein said tank is an oil reservoir for a master brake cylinder of an automotive vehicle and means connecting said tank to the cylinder.

3. A system as claimed in claim 1 wherein said signal means comprises a warning light.

4. A system as claimed in claim 1 wherein the aperture through said float is disposed eccentrically with respect to the vertical axis of said float and said shell.

5. A system as claimed in claim 1 wherein said tubular projection includes an enlarged annular shoulder thereabout to limit downward travel of said float, said switch means being disposed adjacent the shoulder.

6. A system as claimed in claim 1 and further comprising a plug for supporting said connecting means as they pass out of said tubular projection and for closing the lower open end of said tubular projection.

* * * * *

UNITED STATES PATENT OFFICE
CERTIFICATE OF CORRECTION

Patent No. 3,680,044            Dated July 25, 1972

Inventor(s) KAORU TSUBOUCHI

It is certified that error appears in the above-identified patent and that said Letters Patent are hereby corrected as shown below:

The name of the inventor on the patent should be KAORU - not -- Kadru - Tsubouchi Signed and sealed this 24th day of October 1972.

(SEAL)
Attest:

EDWARD M. FLETCHER, JR.            ROBERT GOTTSCHALK
Attesting Officer            Commissioner of Patents